Jan. 28, 1958  W. ESSIG  2,821,368
WATER PRE-HEATER
Filed June 21, 1955
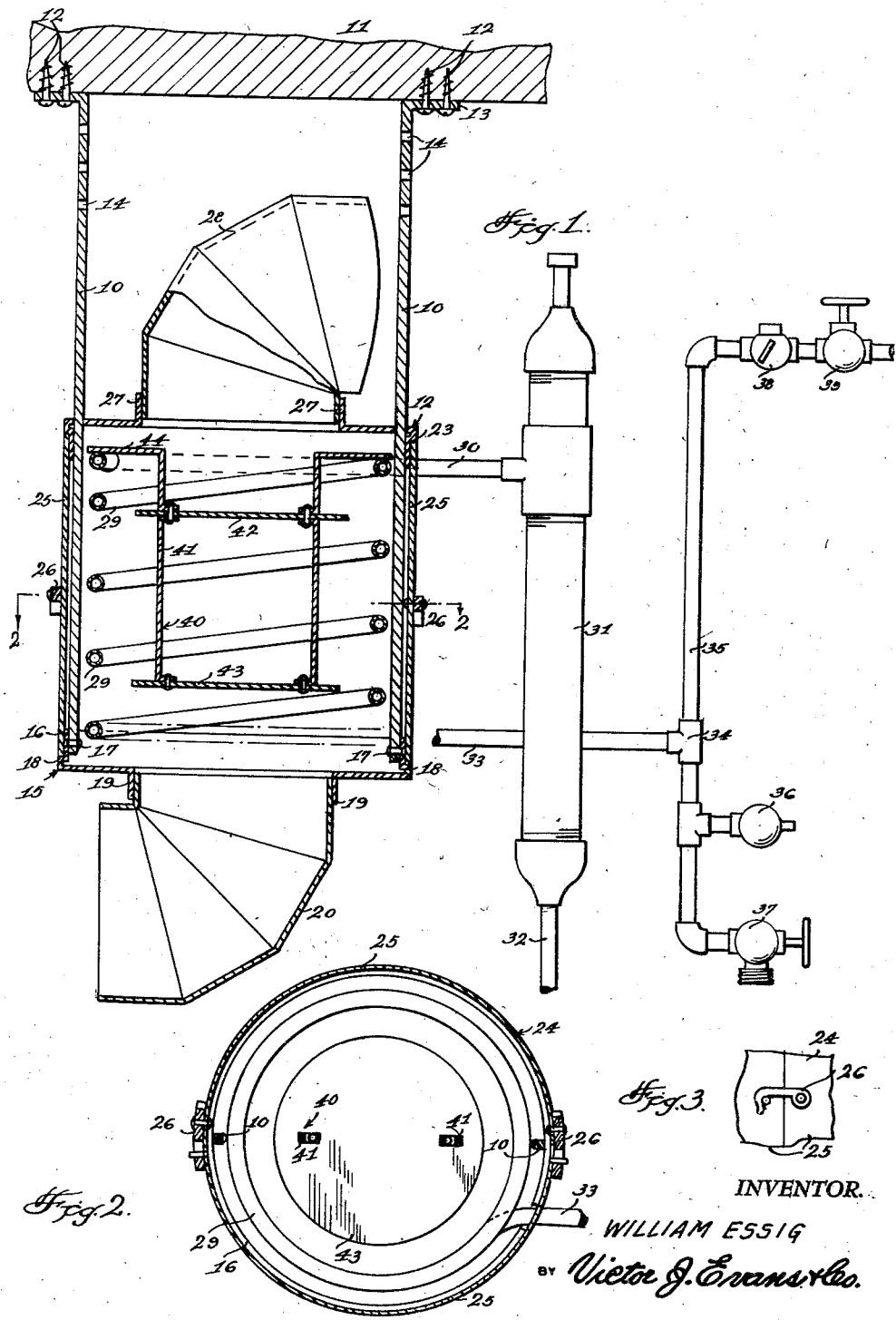
INVENTOR.
WILLIAM ESSIG
BY Victor J. Evans & Co.
ATTORNEYS United States Patent Office 2,821,368
Patented Jan. 28, 1958

2,821,368
WATER PRE-HEATER
William Essig, Bronx, N. Y.
Application June 21, 1955, Serial No. 516,929
2 Claims. (Cl. 257—229)

This invention relates to a fluid heater, and more particularly to a device for heating water.

The object of the invention is to provide a heater which will efficiently raise the temperature of a fluid such as water, to any desired level.

Another object of the invention is to provide a water pre-heater which can be readily taken apart and cleaned, and whereby the coil within the heater can be readily replaced when desired, there being deflectors or baffles for causing the heat to travel in a circuitous path so as to increase the effectiveness of the heater.

A further object of the invention is to provide a water pre-heater which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a vertical sectional view taken through the pre-heater of the present invention, and with parts broken away and in section.

Figure 2 is a sectional view taken on the line 2—2 of Figure 1.

Figure 3 is a fragmentary elevational view illustrating the latches for holding the sections of the casing together.

Referring in detail to the drawings, the numeral 10 designates each of a pair of bars which are arranged in spaced parallel relation with respect to each other, and the bars 10 include flanges 13 on their upper ends which are adapted to be secured to a ceiling or other supporting structure 11, through the medium of bolts or screws 12, Figure 1. The bars 10 may be provided with apertures or openings 14 whereby suitable securing elements can be extended through these openings 14 and into engagement with rafters, beams or the like.

There is further provided a lower bracket which is indicated generally by the numeral 15, and the bracket 15 includes a reduced diameter portion 16 which is secured to the lower ends of the bars 10 by suitable securing elements 17. The reduced diameter portion 16 defines a shoulder 18.

Depending from the bracket 15 and secured thereto or formed integral therewith is a reduced diameter collar 19 which has a lower pipe 20 secured thereto, and the pipe 20 may be connected to a steam or hot water boiler, or hot air heater or the like.

There is further provided an upper bracket 21 which includes a reduced diameter portion 22 that defines a shoulder 23.

There is further provided a housing or casing 24 of cylindrical shape, and the casing 24 includes a pair of similar semi-cylindrical sections 25 which may be maintained in their closed or assembled position by means of latches 26. A collar 27 projects upwardly from the bracket 21, and a pipe 28 is connected to the collar 27 for the passage therethrough of exhaust gases or the like.

Positioned in the casing 24 is a coil 29, and a conduit 30 is connected to the upper end of the coil 29, the conduit 30 leading to a housing or enlarged pipe 31. A conduit or pipe 32 leads from the lower end of the housing 31, and the conduit 32 is adapted to convey hot water to any desired location. A conduit 33 is connected to the lower end of the coil 29, and the conduit 33 has a T-fitting 34 connected thereto, there being a conduit 35 leading from the fitting 34 to a suitable source of cold water to be heated. A relief valve 36 and draw cock 37 may be connected to the conduit 35. The conduit 35 may further be provided with a check valve 38 and inlet valve 39. There is further provided a baffle or deflector assembly which is indicated generally by the numeral 40, and the baffle assembly 40 includes spaced apart arms 41 which have upper and lower discs or plates 42 and 43 secured thereto. Flanges 44 are arranged in the upper ends of the arms 41, and the flanges 44 abut or engage the top of the coil 29 whereby the baffle can be readily supported. Thus, the hot gases entering through the pipe 20 are caused to follow a circuitous path by means of the baffle assembly 40 so that the water flowing through the coil 29 will be efficiently heated.

From the foregoing, it is apparent that there has been provided a device which is especially suitable for heating fluid such as water. In use, cold water may be fed through the conduit 35 from a suitable source of supply, and the valve 39 can be used to control the quantity of water flowing through the conduit 35, the valve 38 being a check valve. This cold water then flows through the conduit 33 into the bottom of the coil 29 then the cold water circulates up through the coil 29 and passes out through the conduit 30 and into the pipe 31 and then down through the conduit 32 whereby it can be conveyed to any suitable source or location wherever the hot water is required or desired. The water leaving the conduit 32 is hot. The heating of the water or other fluid is accomplished by the hot gases which pass up through the pipe 20 and then enter the lower end of the casing 24. These hot gases of combustion or the like pass around the coil 29 and the plates 43 and 42 of the baffle assembly 40 cause the hot gases to effectively warm all parts of the coil so that the water circulating through the coil will be effectively warmed. The exhaust products of combustion pass out through the conduit 28 to any suitable locality. By disengaging the latches 26, the pair of sections 25 of the casing 24 can be disconnected and also the baffle 40 can be removed as when the parts are to be replaced or cleaned.

The pre-heater of the present invention can be used in connection with hot water supply systems in homes or the like. The pipe 28 can lead to the chimney. The jacket or casing 24 can be made of iron and the coil 29 can be made of copper. The conduit 32 may be connected to a steam fixture, hot water heater, generator, tank or the like. The upper ends of the bars 10 can be secured to the ceiling 11. The pre-heater is efficient to use and can be placed near the heating device and it is easy to take apart and clean. Furthermore, there are no parts which will rust and the device is compact and ruggedly constructed. Thus, there will be a saving in the amount of fuel used.

I claim:

1. In a heater, a pair of spaced parallel bars adapted to be secured to a supporting structure, a lower bracket including a reduced diameter cylindrical portion secured to the lower end of said bars and said bracket including a lower depending collar, a lower pipe connected to said collar, an upper bracket arranged above said lower bracket and including a cylindrical reduced diameter portion defining a shoulder, a cylindrical casing including a pair of semi-cylindrical sections arranged in engagement with said reduced diameter portion, a collar of reduced diameter extending upwardly from said upper bracket, an upper pipe connected to the collar on said upper bracket, a coil positioned in said casing, conduits connected to the ends of said coil, valve means arranged in certain of said conduits, latches for maintaining the semi-cylindrical sections of said casing connected together, baffle means arranged in said casing, said baffle means comprising spaced apart arms, flanges extending outwardly from the upper ends of said arms and resting on the top of said coil, and plates extending between said arms and secured thereto.

2. A heater comprising a pair of spaced parallel bars including flanges on their upper ends adapted to be secured to a supporting structure, said bars being provided with apertures whereby suitable securing elements can be extended through the apertures and into engagement with rafters, beams or the like, a lower bracket including a reduced diameter cylindrical portion secured to the lower end of said bars and said bracket including a lower depending collar of reduced diameter, a lower pipe connected to said collar, an upper bracket arranged above said lower bracket and including a cylindrical reduced diameter portion defining a shoulder, a cylindrical casing including a pair of semi-cylindrical sections arranged in engagement with said reduced diameter portion, a collar of reduced diameter extending upwardly from said upper bracket, an upper pipe connected to the collar on said upper bracket, a coil positioned in said casing, conduits connected to the upper and lower ends of said coil, a relief valve and draw cock connected to one of said conduits, baffle means arranged in said casing, said baffle means comprising spaced apart arms, flanges extending outwardly from the upper ends of said arms and resting on the top of said coil, and plates extending between said arms and secured thereto, and latches for maintaining the semi-cylindrical sections of said casing connected together whereby by disengaging the latches, the pair of sections of the casing can be disconnected and also the baffle can be removed as when the parts are to be replaced or cleaned.

References Cited in the file of this patent
UNITED STATES PATENTS

| | | |
|---|---|---|
| 1,366,957 | Schneible | Feb. 1, 1921 |
| 1,698,456 | Schneible | Jan. 8, 1929 |
| 2,270,665 | Wheller | Jan. 20, 1942 |
| 2,582,071 | Schultz | Jan. 8, 1952 |
| 2,616,412 | Backus | Nov. 4, 1952 |